Aug. 29, 1933.  A. P. E. BOURDET  1,924,905
METHOD FOR HEATING SUBSTANCES SUCH AS GYPSUM IN AIR CURRENTS
Filed July 23, 1930  2 Sheets-Sheet 1

Inventor
Andre Paul Edward Bourdet
by
Abraham Barnett
atty

Inventor
Andre Paul Edward Bourdet by Abraham Barnett
atty

Patented Aug. 29, 1933

1,924,905

UNITED STATES PATENT OFFICE 1,924,905

METHOD FOR HEATING SUBSTANCES SUCH AS GYPSUM IN AIR CURRENTS

André Paul Edouard Bourdet, Triel-sur-Seine, France

Application July 23, 1930, Serial No. 470,020, and in Belgium December 19, 1929

1 Claim. (Cl. 222—6)

The present invention relates to methods for heating substances such as gypsum in air currents and furnaces adapted to carry out these methods.

One of the objects of the invention is to provide methods and apparatus for heating gypsum and like substances in an air current so as to obtain rapid and complete action without danger of overheating.

Another object is to provide a novel furnace structure insuring efficient mixing of materials being treated.

Further objects will appear in the course of the detailed description now to be given with reference to the accompanying drawings, in which.

Figure 1:
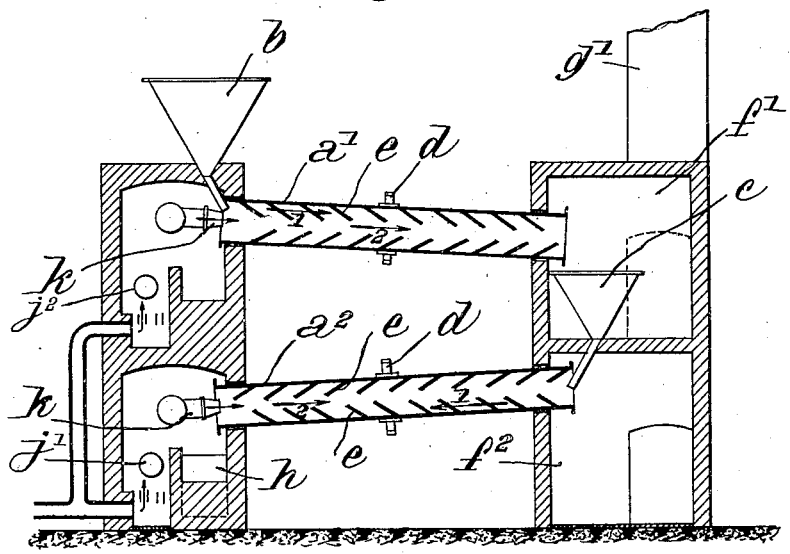
Fig. 1 is a section through one illustrative embodiment of the invention.
Figure 2:
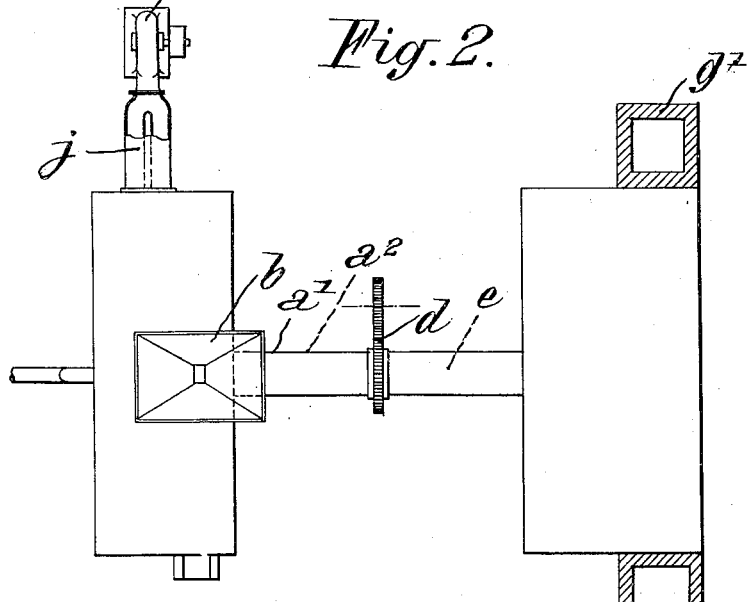
Fig. 2 is a plan of the structure shown in Fig. 1.

Referring to Figs. 1 and 2 of the drawings, there is shown a furnace assembly composed of a pair of oppositely inclined tubes $a^1$ and $a^2$, a hopper $b$ for feeding material into tube $a^1$, a hopper $c$ receiving material from $a^1$ and delivering to $a^2$, a pinion $d$ for each tube driven from a motor (not shown), a pair of dust-collecting flues $f^1$ and $f^2$ positioned on the same end of tubes $a^1$ and $a^2$ and fitted with heat recuperating devices (not shown), a pair of chimneys $g^1$ and $g^2$ communicating separately with $f^1$ and $f^2$ respectively, a discharge compartment $h$ positioned to receive material falling from tube $a^2$, tuyères or air inlets $j^1$ and $j^2$ positioned above properly designed heating grates adapted to receive solid fuel or coupled to oil burners of conventional design, the air for $j^1$ and $j^2$ being drawn from flues $f^1$ and $f^2$ or chambers (not shown) enclosing tubes $a^1$ and $a^2$ by air pumps $i$ so as to be preheated, and ventilators $k$ provided with preheated air from flues $f^1$, $f^2$ by pumps similar to $i$ not shown or by pumps $i$ themselves and serving to produce a slight forced draft in the directions shown.

The essential novel feature in the above described furnace is the relative direction of the material being treated and the heated air or gases. Whereas in furnaces as hitherto constructed, it has been the practice to direct the air current in both tubes in the opposite direction to that in which the material treated moves, in the present furnace, the heated air current and material are codirectional in tube $a^1$ and "antidirectional" in tube $a^2$. Material fed at $b$ accompanies the air current along $a^1$ as shown by arrows 1 and 2 inside the latter, drops into hopper $c$, proceeds down $a^2$ as shown by arrow 1 inside the latter in the direction opposite to the heated gas current represented by arrow 2, and is delivered into bin or receptacle $h$.

In the special case where gypsum is to be converted into plaster of Paris, this heating system is found (1) to be more economical as to heat consumption and tube dimensions for a given capacity and (2) to reduce to a minimum any possibility of scorching. Preferably, tube $a^1$ should be hotter than $a^2$ so as to immediately drive off the combined water and minimize the possibility of scorching. In the prior art, the inverse procedure has been followed, tube $a^2$ being the hotter. Obviously, the hydrated material is more capable of withstanding elevated temperatures without danger of deterioration of quality than the dehydrated material. As representing typical operating conditions (though these will vary with the dimensions and capacity of the tubes, the quality of material and rate of movement thereof), the temperature of the gas entering $a^1$ should be adjusted to produce an operating temperature inside the latter of about 750° C., the corresponding gases entering $a^2$ being regulated to yield an interior temperature of about 350° C.

The division of the heating operation into two steps carried out in tubes $a^1$ and $a^2$ permits samples to be taken at $c$ so that the temperature, rate of rotation, rate of advancing the material, draft etc., may be regulated to modify the rate of dehydration in $a^1$ and the drying operation in $a^2$. The greater part of the moisture it will be noted is eliminated in tube $a^1$ and passes out via flue $f^1$ and chimney $g^1$, and tube $a^2$, operating at a relatively low temperature, completes the water eliminating process without exposing the plaster to any possibility of scorching.

The above described procedure, when applied to the manufacture of plaster, is found to be particularly flexible and capable of being controlled to produce coarse, fine, extra-fine, Belgian, modeling and other types of plasters having any setting time or strength desired.

Obviously the invention is not limited to the heat treatment or drying of plaster, but may be applied to any wet material. In the special case of cement, the powdered raw material is first humidified in a tube furnace so as to obtain small lumps prior to the heat treatment driving out the $CO_2$ and producing clinker.

The invention may also be applied to the treatment of wood, for instance in small pieces, for the manufacture of brands, charcoal, etc.; in that case, the heating gases are preferably reducing gases, and may be partially constituted by the burnt gases leaving the furnaces.

If desired, the direction of the gases may be regulated so that those in the first tube ($a^1$) are antidirectional relatively to the material and codirectional in the second tube ($a^2$), a method of this type being particularly adapted to the treatment of a material which should have a very low finishing temperature.

Figure 3:
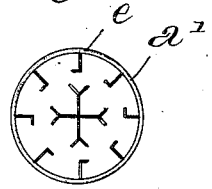
Fig. 3 shows, in diagrammatic section, a tube furnace provided with special baffles.

The form of tube furnace shown in Fig. 3 is designed to insure thorough mixing and includes a plurality of longitudinal partitions $e$.

Figure 4:
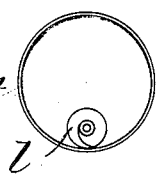
Fig. 4 represents another type of tube furnace.
Figure 5:
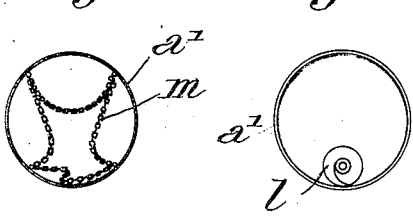
Fig. 5 illustrates, in section, still another form of tube furnace.
Figure 6:
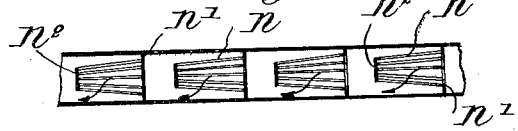
Fig. 6 is a longitudinal section through a tube furnace fitted with special baffles.

In the structure shown in Fig. 4, chains $m$, attached to the tube walls effect the mixing, while in Fig. 5 a screw conveyor $l$ performs the same function. The special mixing device shown in Fig. 6 consists of a plurality of rings $n^1$ positioned in spaced relation to rings $n^2$ of lesser diameter and connected by inclined bars $n$.

Figure 7:
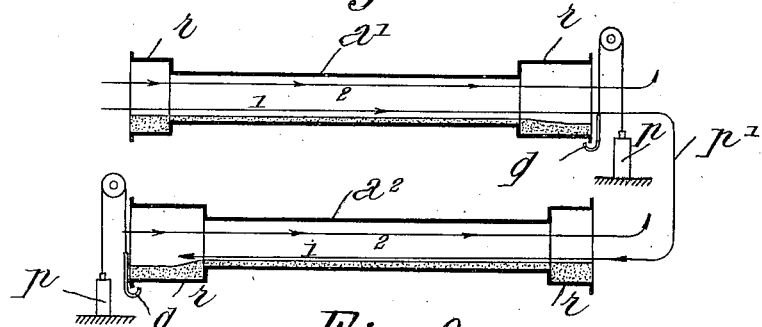
Fig. 7 represents a heating system including a pyrometric control.

Either tube $a^1$ or $a^2$ or both may be fitted with automatic means for regulating the rate of movement of the material being treated as a function of the temperature in the manner shown in Fig. 7. Here, a pyrometer $p$ operates a servo-motor controlling by means of a cable $p^1$ the height of a movable wall $q$ engaging with the flange formed on portion $r$ of the tube. Wall $q$ follows the variations in temperature and, by its upward or downward movement, forms an obstacle of the material inside the tube for a variable space of time.

Figure 8:
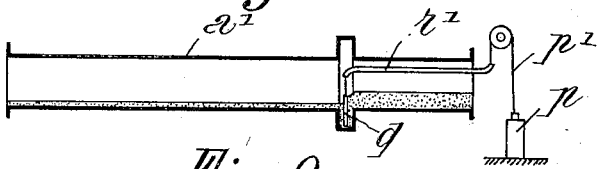
Fig. 8 shows a variant of the system illustrated in Fig. 7.

In the variant shown in Fig. 8, wall $q$ is suspended inside the furnace from a tube $r^1$ extending into the latter and carrying the cable controlled by pyrometer $p$.

Figure 9:
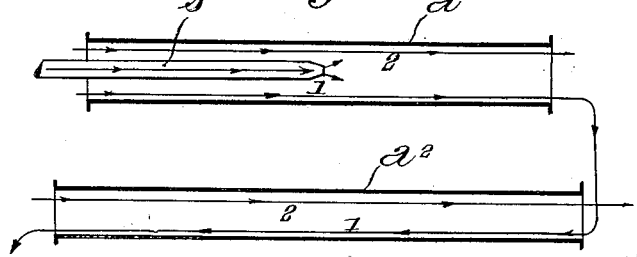
Fig. 9 is a longitudinal section through a tube furnace provided with a special system for feeding material.

The tube furnace shown in Fig. 9 differs from those already described only in the adjunction of a tube $s$ adapted to drop the material to be treated, at a point well within the furnace. The numerals 1 and 2, in Figs. 7 and 9 designate the path of the materials and heating gases respectively through the tubes.

It is to be understood that the invention is not limited to the use of inclined rotating tube furnaces, but may be applied, equally well, to stationary or horizontal furnaces provided with screw conveyors or like structures for advancing the material therethrough; similarly pyrometer $p$ may be replaced by a hygrometer or similar instrument responsive to variations in moisture or some other variable factor, and the rate of flow of material through either tube may be thus regulated as a function of changes in moisture or the particular variable factor chosen; thus, in the manufacture of wood charcoal, the moisture driven off during passage of wood through the first tube may control a hygrometer regulating the time of treatment in that tube.

What I claim is:—

In the method of converting gypsum into plaster the step of displacing said gypsum and a hot gas in the same direction, said gas having a relatively high temperature, and then displacing the gypsum thus heated and a hot gas in opposite directions, said last named hot gas having a lower temperature than the first.

ANDRÉ PAUL EDOUARD BOURDET.